H. J. H. LAFLÈCHE.
POTATO PLANTER.
APPLICATION FILED AUG. 8, 1919.
1,354,202.
Patented Sept. 28, 1920.
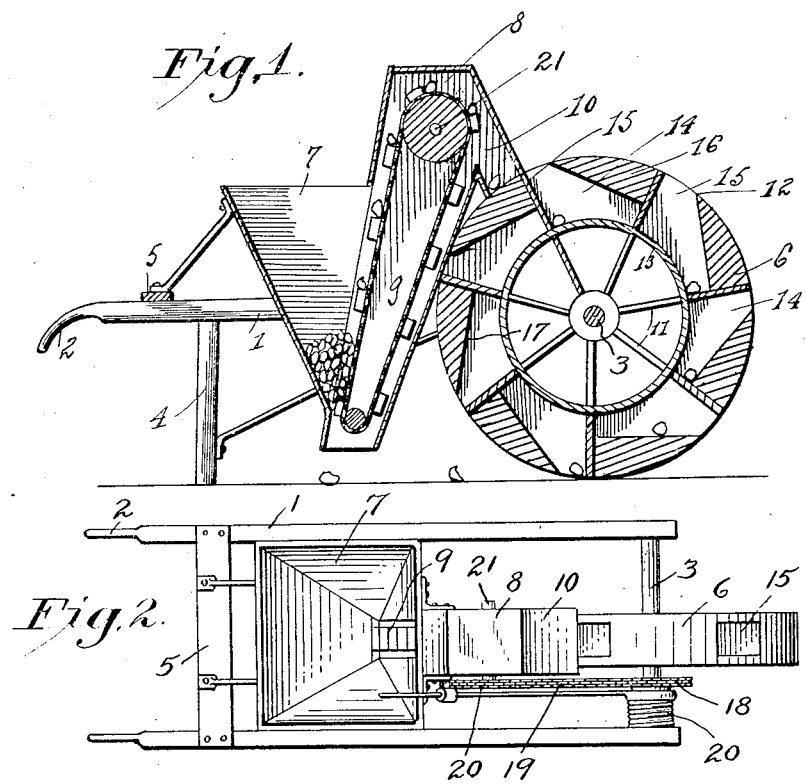
Inventor:
Herménégilde J. H. Laflèche
William C. Sinton
Attorney

UNITED STATES PATENT OFFICE.

HERMENEGILDE J. H. LAFLECHE, OF CASSELMAN, ONTARIO, CANADA.

POTATO-PLANTER.

1,354,202.   Specification of Letters Patent.   Patented Sept. 28, 1920.

Application filed August 8, 1919. Serial No. 316,116.

*To all whom it may concern:*

Be it known that I, HERMENEGILDE J. H. LAFLECHE, a subject of the King of Great Britain, residing at Casselman, Province of Ontario, Canada, have invented certain new and useful Improvements in Potato-Planters; and I do hereby declare that the following is a full, clear, and exact description of the invention, such as will enable others skilled in the art to which it appertains to make and use the same.

The present invention relates to potato planters, and an object thereof is to provide a planter of this character whereby the potatoes will be deposited upon the ground in proper spaced relation.

With the above and other objects in view which will hereinafter appear as the description continues, the invention consists of the novel features of construction, combination and formation of parts as will be hereinafter more fully described and particularly pointed out in the appended claim.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claim without departing from the spirit of the invention or sacrificing the efficiency of the same.

In the accompanying drawings:

Figure 1 is a vertical longitudinal sectional view of the planter embodying the present invention; and Fig. 2 is a top plan view of the same.

Referring now more particularly to the accompanying drawings wherein like and corresponding parts are designated by similar reference characters throughout the several views.

The planter embodying the present invention comprises a frame consisting of a pair of spaced bars 1 having handles 2 formed with one end thereof and a shaft 3 journaled within the opposite ends thereof. Depending from the bars 1 are suitable supports 4 and these bars are connected by means of a transverse bar 5. Keyed to the axle 3 is a ground wheel 6 in which the potatoes are deposited and finally drop upon the ground in the proper spaced relation to form mounds equidistant apart. Supported within the bars 1 is a hopper 7 and arranged adjacent this hopper is a casing 8 having an endless elevating carrier 9 arranged therein. This elevator 9 is adapted to take potatoes or parts thereof which are deposited within the hopper 7 and elevate the same within the casing 8, and after these potatoes have been elevated they are finally deposited within a chute 10. The ground wheel 6 comprises a hub portion which has a plurality of radially extending spokes 11 formed therein and these spokes are connected by an outer rim 12 and an inner concentric rim 13, thereby forming a plurality of compartments 14 within the wheel. The outer rim 12 is provided with openings 15 which lead within the compartments 14 and arranged within the compartments 14 and suitably connected to spokes 11 and outer rim 12 are the blocks 16 having inclined faces 17. As the wheel 6 is rotated the outer periphery thereof by passing under the spout 10 closes the same, but as each opening 15 registers with this spout or chute a potato contained within the chute will drop through one of the openings 15 into one of the compartments 14. As the planter is propelled over the ground the potatoes contained within the wheel will assume the positions as shown in Fig. 1.

The faces 17 of said blocks 16 are disposed in such angular plane, that the said inclinations cause a potato to drop out of each compartment 14, when the latter have reached their lowermost position in the travel of wheel 6 and consequently when each opening 15 registers with the ground.

The elevator 9 is operated by means of a sprocket wheel 18 mounted on axle 3 of the ground wheel 6, and a sprocket chain 19, passes over sprocket wheel 18 and another sprocket wheel 20 on shaft 21.

As the planter is propelled over the ground the wheel 5 will revolve and likewise the sprocket wheel 18 will also be caused to revolve, thereby bringing the elevator 9 into operation. As the potatoes or parts thereof are placed within the hopper they will come in contact with this elevator and when the elevator is set in motion the potatoes will be elevated and finally be deposited within the chute 10. As an opening 15 registers with the chute a potato will be dropped within each compartment 14 and substantially be deposited in the proper spaced relation within the ground.

Having thus fully described my inven- tion, what I claim as new and desire to secure by Letters Patent is:

A potato planter comprising a frame, a ground wheel having a hub supported within said frame, said ground wheel formed with inner and outer rims, spokes connecting said hub and rims, blocks secured to said spokes between said rims and forming compartments having outlet openings, said blocks formed with inclined inner surfaces which diverge toward their point of connection with said spokes and the angle of inclination of said blocks, causing the potatoes to drop out of said compartments, when the latter have reached their lowermost position in the travel of the ground wheel.

In witness whereof I have hereunto set my hand.

HERMENEGILDE J. H. LAFLECHE.